Figure 1:
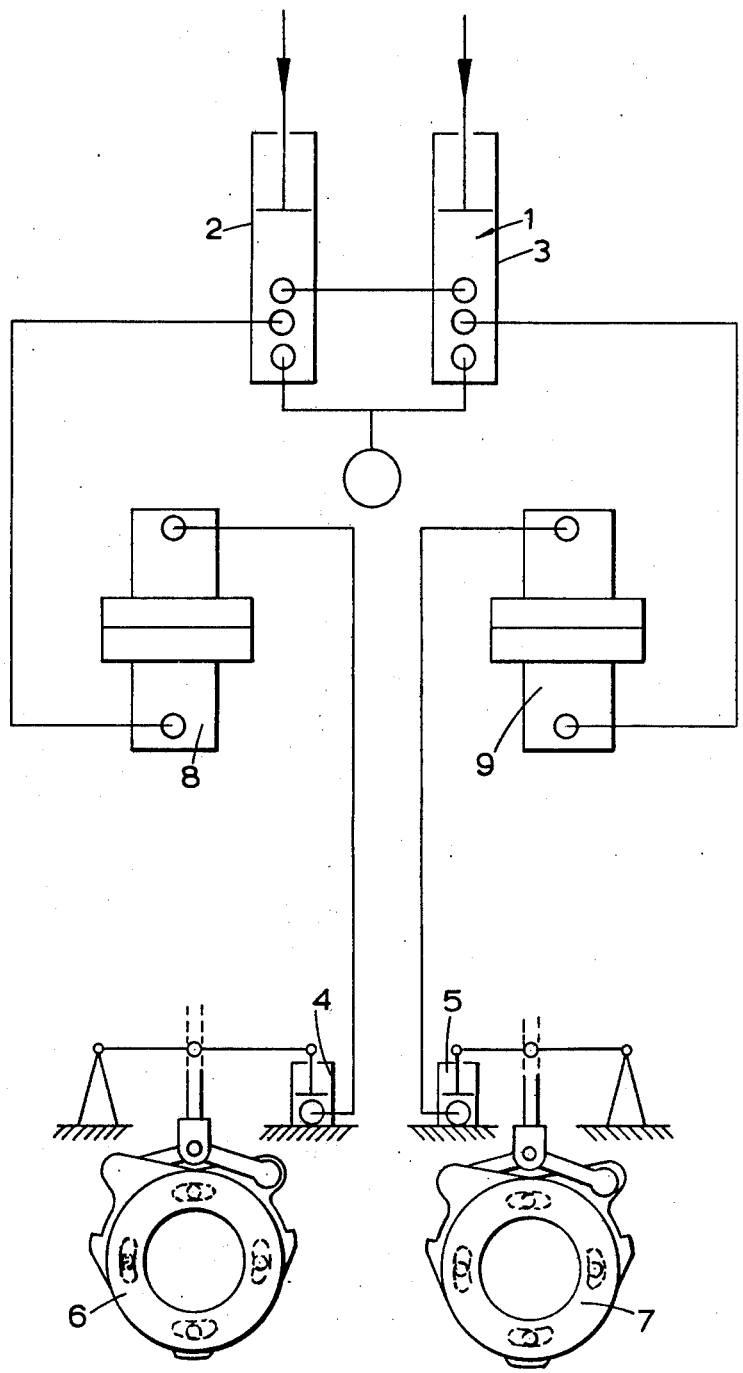

United States Patent [19]

Röhling

[11] 4,054,326
[45] Oct. 18, 1977

[54] HYDRAULIC BRAKING SYSTEMS FOR VEHICLES

[75] Inventor: Bernd Holger Röhling, Andernach, Germany

[73] Assignee: Girling Limited, Birmingham, United Kingdom

[21] Appl. No.: 641,235

[22] Filed: Dec. 16, 1975

[30] Foreign Application Priority Data

Jan. 2, 1975  United Kingdom ............... 147/75

[51] Int. Cl.² .............................................. B60T 8/14
[52] U.S. Cl. ................................................. 303/24 A
[58] Field of Search ................. 180/6.2; 185/16, 177; 303/6 R, 6 C, 22 R, 24 A, 24 C, 24 F

[56] References Cited

U.S. PATENT DOCUMENTS

| | | | |
|---|---|---|---|
| 3,237,997 | 3/1966 | Kerr | 303/24 A |
| 3,459,458 | 8/1969 | Green et al. | 180/6.2 X |
| 3,466,096 | 9/1969 | Cunningham | 180/6.2 X |
| 3,727,990 | 4/1973 | Vogt | 303/24 A |
| 3,834,769 | 9/1974 | Just | 188/16 X |

*Primary Examiner*—Duane A. Reger
*Attorney, Agent, or Firm*—Scrivener, Parker, Scrivener & Clarke

[57] ABSTRACT

In a vehicle having a high center of gravity and having brakes on wheels on opposite sides operated by hydraulic actuators, either simultaneously for pure vehicle retardation or independently for steering fluid, fluid under pressure from a master cylinder assembly is supplied to all the hydraulic actuators through a inertia-controlled device so that the pressure of fluid from the master cylinder assembly is reduced at least when the brakes are applied simultaneously for pure vehicle retardation and the deceleration of the vehicle exceeds a predetermined value.

7 Claims, 3 Drawing Figures

HYDRAULIC BRAKING SYSTEMS FOR VEHICLES

SPECIFIC DESCRIPTION

This invention relates to hydraulic braking systems for vehicles of the kind in which brakes on opposite sides of a vehicle are adapted to be applied by a pedal-operated hydraulic master cylinder assembly which is adapted to supply hydraulic fluid under pressure to hydraulic actuators for operating the brakes, the brakes being applied simultaneously for pure vehicle retardation or independently to assist steering.

In certain categories of vehicle with high centres of gravity, for example combine harvesters, difficulty is experienced in preventing such vehicles from tipping over when the brakes are applied simultaneously with the vehicle travelling, for example on a road, at a speed in excess of its normal field operational speed.

In such vehicles it is known to incorporate between the master cylinder assembly and the actuators pressure reducing/limiting valve means for reducing the pressure which can be applied to the actuators from the master cylinder assembly, with the result that the brakes can never be applied with sufficient force for the remaining inertia of the vehicle to cause it to tip.

The provision of such pressure reducing/limiting valve means is not wholly satisfactory since they are at all times operative to reduce the pressure which can be applied to the actuators from the master cylinder assembly. Thus the effectiveness of the brakes on opposite sides of the vehicle is unnecessarily reduced at all times, both when the brakes are to be applied simultaneously for pure vehicle retardation, or independently to assist steering. This is particularly disadvantageous since, during operational roles in the field, it is unlikely that the vehicle would attain a speed capable of producing sufficient inertia for the vehicle to tip if the brakes were then applied simultaneously.

According to our invention in an hydraulic braking system of the kind set forth for a vehicle inertia-controlled valve means is interposed between the master cylinder assembly and the hydraulic actuators so that the pressure of fluid from the master cylinder assembly to all the brakes is reduced at least when the brakes are applied simultaneously for pure vehicle retardation and when the deceleration of the vehicle exceeds a predetermined value.

The inertia-controlled valve means is constructed to become effective at a deceleration less than that at which tipping of the vehicle may occur, and the inertia-controlled valve means is constructed and arranged to remain inoperative when a brake on one side of the vehicle only is applied to assist steering, with the vehicle tending to turn in a circle substantially about the braked wheel as a centre.

The provision of the inertia-controlled valve means ensures that full braking pressure is available during the normal operational roles of the vehicle, irrespective of whether the brakes are applied simultaneously or independently, when it is unlikely that the said predetermined value of deceleration can be attained.

When the master cylinder assembly comprises a single master cylinder for supplying fluid under pressure to the hydraulic actuators of the brakes on both sides of the vehicle through a diverter valve, the inertia-controlled valve means comprises a single inertia-controlled valve inserted in the line between the diverter valve and the master cylinder assembly. When the master cylinder assembly is of dual construction incorporating separate master cylinders for supplying fluid under pressure to the hydraulic actuator of the brakes on opposite sides of the vehicle, the inertia-controlled valve means comprises a pair of inertia-controlled valves, each of which is located in the line between each master cylinder and the actuator of the brake which it operates.

The or each inertia-controlled valve may comprise a single cut-off valve. Preferably, however, the or each inertia-controlled valve is constructed and arranged so that after the said predetermined value of deceleration has been attained, the braking pressure can still increase but at a rate of pressure increase less than that at which the pressure from the master cylinder assembly increases.

Figure 2:
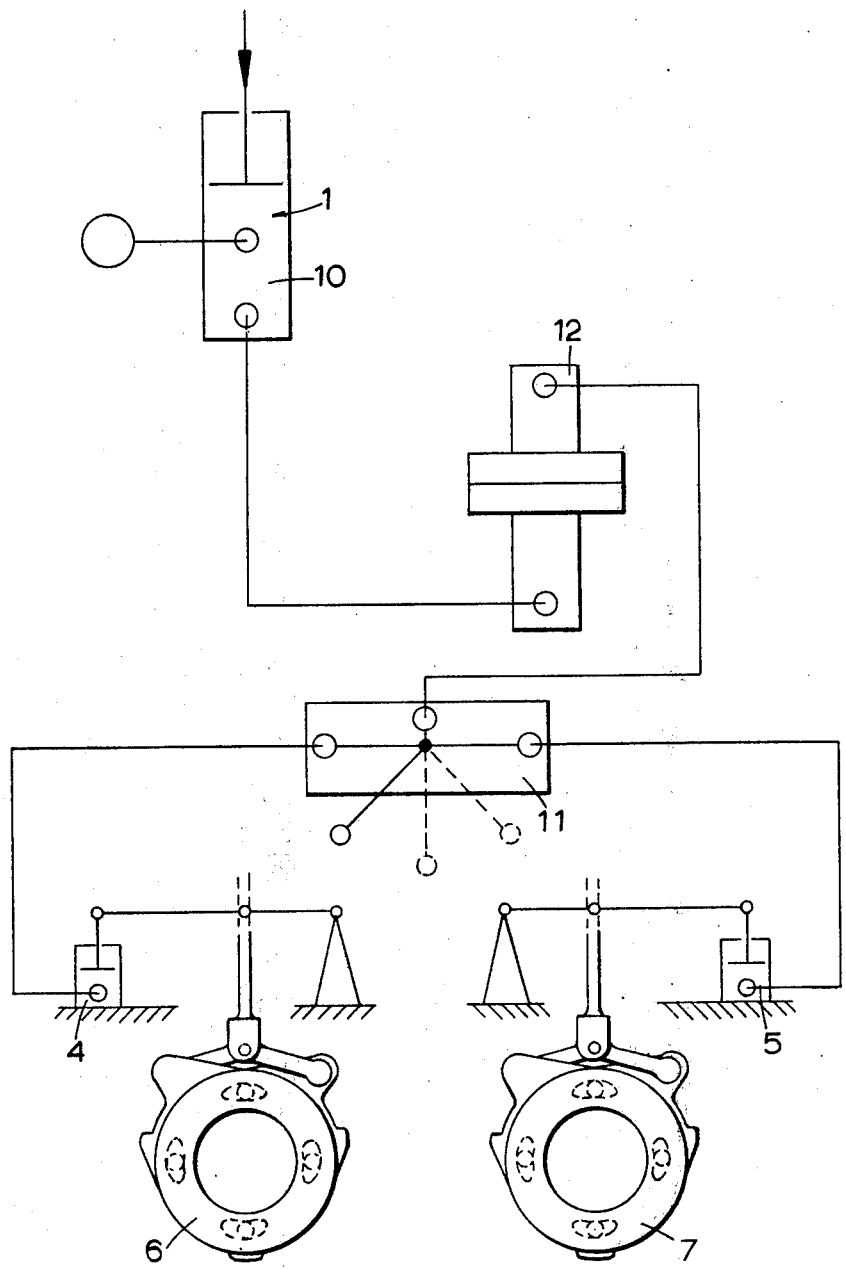
Figure 3:
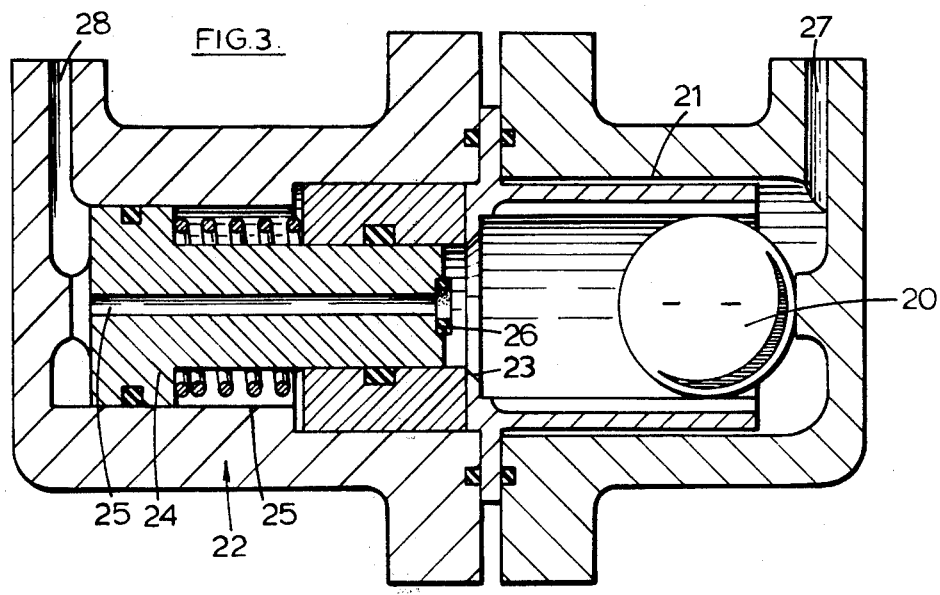

Two embodiments of our invention are illustrated in the accompanying drawings in which:

FIG. 1 is a layout of a dual-hydraulic braking system;
FIG. 2 is a layout of a modified braking system; and
FIG. 3 is a longitudinal section through an inertia valve.

In the braking system illustrated in the layout of FIG. 1 for a combined harvester having a high centre of gravity a dual master cylinder assembly 1 comprises a pair of master cylinders 2,3.

The master cylinders 2,3 are each adapted to supply fluid to separate hydraulic actuators 4,5 for operating brakes 6,7 on wheels on opposite sides of the vehicle. The master cylinders 2,3 are adapted to be operated by separate pedals, either simultaneously for normal braking to apply a pure retardation to the vehicle or independently for steering.

An inertia-controlled valve 8,9 is located between each master cylinder 2,3 and the hydraulic actuator 4,5 which it supplies. Each inertia-controlled valve 8,9 is of known type as shown in FIG. 3 mounted with its main axis on or parallel with the main axis of the vehicle and having an inertia-responsive valve member, conveniently a ball 21, located in a chamber in a housing 22 and engageable automatically with a seating 23 to cut-off the supply of fluid to the actuator when the deceleration of the vehicle in which it is located exceeds a predetermined value less than that which would cause the vehicle to tip over. Preferably also a differential piston 24 working in a stepped bore 25 in the housing is exposed at its end of smaller area to the pressure in the chamber, and at its end of greater area to he pressure in the actuator so that, after the valve closes with the ball engaging the seating, the pressure of fluid supplied to the actuator is increased but at a rate of pressure increase less than the rate at which the master cylinder pressure increases. The piston 24 has a longitudinally extending blind bore 25 and a valve seating 26 surrounding the bore 25 is provided at the inner end of the piston 24 which is of smaller diameter. Gaps in the seating face 23 provide passages for fluid when the ball is in engagement with the seating 23 but spaced from the seating 26. An inlet passage 27 leading to the chamber 21 is connected to the master cylinder 2,3 and an outlet passage 28 leads to the hydraulic actuator 4,5.

The relative areas are chosen to ensure that the rate of increase in the pressures applied to the actuators are insufficient to cause the vehicle to tip over when the master cylinders 2 and 3 are operated simultaneously to apply a pure retardation to the vehicle.

When one of the master cylinders 2,3 is operated on its own to apply the brake on one side of the vehicle to assist steering, the inertia-controlled valve which that master cylinder supplies remains open since the rate of retardation capable of being applied to the vehicle by that brake is insufficient to impart to the vehicle sufficient inertia for the vehicle to tip. Under such conditions, when the brake on one side only of the vehicle is applied, the vehicle tends to turn in a circle, substantially about the brake wheel as a centre and no reduction in the braking effect of that brake is experienced.

In the braking system illustrated in FIG. 2 of the drawings the master cylinder assembly 1 comprises a single master cylinder 10 and both the hydraulic actuators 4 and 5 are supplied with fluid from the master cylinder 10 through a manually-operable diverter valve 11 by means of which the hydraulic actuators 4 and 5 can be operated simultaneously for pure braking or independently for steering. A single inertia-controlled valve 12 of the known type described above is located in the single line from the master cylinder 10 to the diverter valve 11.

The construction and operation of the braking system of FIG. 2 is otherwise the same as that of FIG. 1 and corresponding reference numerals have been applied to corresponding parts.

I claims:

1. In a wheel mounted vehicle having a high centre of gravity hydraulically-operated brakes are provided for braking at least one wheel on each side of said vehicle, and an hydraulic braking system is incorporated for operating said brakes, wherein said braking system comprises hydraulic actuators for applying said brakes, a pedal-operated hydraulic master cylinder assembly having first and second modes of operation, which in its first mode supplies hydraulic fluid to said actuators simultaneously for pure vehicle retardation and in its second mode supplies hydraulic fluid to said actuators independently to assist steering, and inertia-controlled valve means interposed between said master cylinder assembly and said actuators, said inertia controlled valve means being normally open to permit the flow of hydraulic fluid between said master cylinder assembly and said actuators for the brakes on both sides of said vehicle but closing when subjected to a vehicle deceleration exceeding a predetermined value whereby the pressure of fluid from said master cylinder assembly to said actuators is reduced by closure of said valve means at least when said brakes are applied simultaneously for pure vehicle retardation and said vehicle deceleration has exceeded said predetermined value, said predetermined value exceeding that to which said vehicle can be subjected in said second mode of operation of said master cylinder assembly.

2. An hydraulic braking system as claimed in claim 1, including a diverter valve, wherein said master cylinder assembly comprises a single master cylinder for supplying fluid under pressure to said hydraulic actuators of said brakes on both sides of said vehicle through said diverter valve, and said inertia-controlled valve means comprises a single inertia-controlled valve interposed between said diverter valve and said master cylinder assembly.

3. An hydraulic braking system as claimed in claim 1, wherein said master cylinder assembly is of dual construction incorporating separate master cylinders for supplying fluid under pressure separately to said hydraulic actuators of said brakes on opposite sides of the vehicle, and said inertia-controlled valve means comprises a pair of inertia-controlled valve means, each of said inertia-controlled valve being interposed between one of said master cylinders and said actuator of said brake said one master cylinder is adapted to operate.

4. An hydraulic braking system as claimed in claim 2, wherein said inertia-controlled valve comprises a cut-off valve.

5. An hydraulic braking system as claimed in claim 3, wherein each said inertia-controlled valve comprises a cut-off valve.

6. An hydraulic braking system as claimed in claim 2, wherein said inertia-controlled valve is constructed and arranged so that after the said predetermined value of deceleration has been attained, said pressure of fluid from said master cylinder can still increase but at a rate of pressure increase less than that at which said pressure of fluid from said master cylinder increases.

7. An hydraulic braking system as claimed in claim 3, wherein each said inertia-controlled valve is constructed and arranged so that after the said predetermined value of deceleration has been attained, said pressure of fluid from said master cylinder assembly can still increase but at a rate of pressure increase less than that at which said pressure of fluid from said master cylinder assembly increases.

* * * * *